UNITED STATES PATENT OFFICE.

GERALD PHILIP PLAISANCE, OF ST. LOUIS, MISSOURI, ASSIGNOR TO RALSTON PURINA COMPANY, OF ST. LOUIS, MISSOURI, A CORPORATION OF MISSOURI.

MEANS FOR PREVENTING FORMATION OF MOLD.

1,318,174.     Specification of Letters Patent.     Patented Oct. 7, 1919.

No Drawing.     Application filed August 3, 1918. Serial No. 248,161.

*To all whom it may concern:*

Be it known that I, GERALD P. PLAISANCE, a citizen of the United States, residing at the city of St. Louis, in the State of Missouri, have invented certain new and useful Improvements in Means for Preventing Formation of Mold, of which the following is a specification.

The present invention relates to the preservation of food, and is particularly directed to the preservation of animal feeds from attack by mold. Mold is a fungous growth which develops readily on materials containing vegetable sweetening matter, which is contained by the major part of the cattle foods, and the effect of mold is to produce a characteristic disagreeable taste or flavor in the product, and, in general, animals will not eat food which has been attacked by mold. This invention is also applicable to the treatment of human foods, particularly relatively dry solid foods subject to attack by mold.

The process of the present invention is applied by sprinkling on, or otherwise applying to, the food matter a small quantity of an acid. Various acids may be employed among the mineral or inorganic acids, muriatic acid being suitable; also phosphoric acid. Organic acids, such as acetic, lactic, citric, and tartaric, can be employed. The food material which ordinarily may be in the form of a solid mass composed of relatively small particles is sprayed or otherwise treated with a small quantity of the liquid acid. This operation can be conveniently effected by means of an atomizer, or similar device, while the material constituting the food is being tumbled or agitated. It is preferable to apply about one-half of one per cent. of hydrochloric acid if this is to be the acid employed, although other acids can be employed, as above noted. In order conveniently to coat the major portion of the particles with a light film of the hydrochloric acid, it is advisable to use an acid of about thirty to forty per cent. strength.

With feeds containing dried, or substantially dried, molasses, spread out upon other food materials, or other materials which go to make up the mixed feed, the process above referred to has been found to produce a highly desirable flavor or taste, which, to a certain extent, overcomes the sweet taste produced by the molasses. Other varieties of material which can be treated in accordance with the present invention are corn, shelled corn, meal, other grain, either in the whole or comminuted condition, and even food materials of animal origin, particularly those which are substantially dry, that is to say, which do not contain more than about twenty-five per cent. of moisture.

After treating the food material in accordance with the process above described, the material may be kept in a dry place, but it is not necessary to avoid such amounts of dampness as would ordinarily cause untreated food products of the same character to develop mold.

I claim:

The process of preserving solid food products, consisting in spraying hydrochloric acid of substantially one half of one per cent. strength on the surface portions only of the solid food to prevent mold growth.

In testimony whereof I hereunto affix my signature.

GERALD PHILIP PLAISANCE.